Patented Sept. 3, 1940

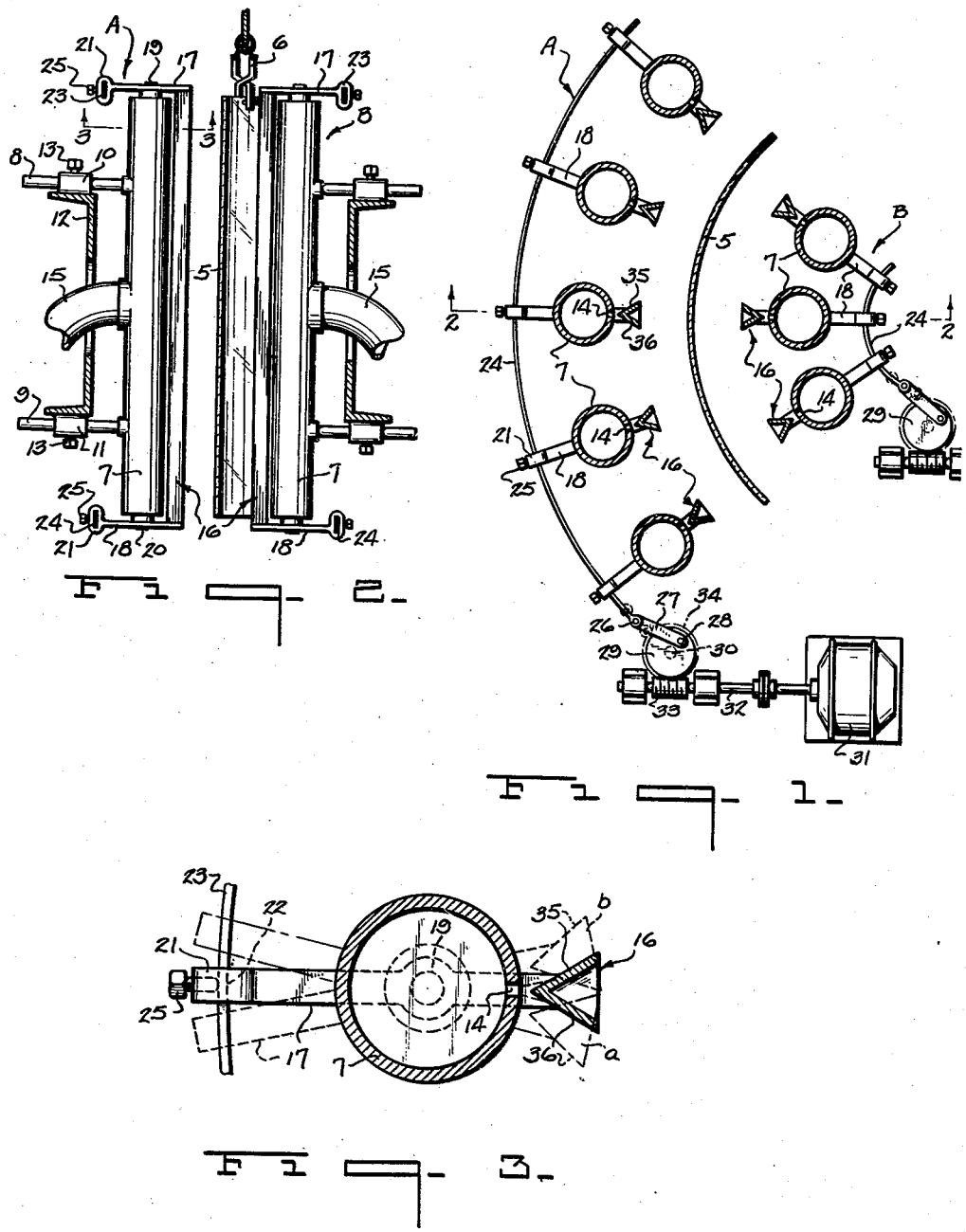

2,213,405

UNITED STATES PATENT OFFICE 2,213,405

APPARATUS FOR TEMPERING GLASS

Ormond H. Paddock, Rossford, Ohio, assignor to Libbey-Owens-Ford Glass Company, Toledo, Ohio, a corporation of Ohio Application November 18, 1937, Serial No. 175,244

9 Claims. (Cl. 49—45)

The present invention relates broadly to the tempering of glass and more particularly to improvements in apparatus for tempering sheets of curved or bent glass.

In the practice of one well known process for tempering glass sheets, the sheets are first heated to approximately the point of softening of the glass and then suddenly chilled to place the outer surfaces of the sheets under compression and the interiors thereof under tension. The sheet is ordinarily maintained in a vertical position during the treatment thereof, and it is customary to suspend the sheet from a plurality of relatively small tongs or hooks engaging the same near its upper edge. The glass sheet is first heated to the desired temperature in a suitable furnace and upon removal therefrom is subjected immediately to the action of suitable cooling means by which the glass is suddenly chilled. The cooling means usually employed comprises spaced blower heads between which highly heated glass sheet is received, said blower heads being provided with a plurality of nipples serving to direct jets or blasts of air upon opposite faces of the sheet simultaneously. These blower heads are preferably mounted for oscillatory movement in the plane of the sheet to effect a more uniform distribution of the air over the surfaces thereof and in consequence a more uniform cooling of the glass.

In the tempering of sheets of curved or bent glass, it has been found that the usual form of cooling apparatus employed in the tempering of flat sheets of glass, such as where the nipples are arranged in a flat plane, is unsuitable in that it produces irregular cooling when applied to a curved or bent sheet by reason of the nipples being at varying distances from the sheet. Also, the inability to oscillate the cooling apparatus without striking the glass if said cooling apparatus has been shaped to conform to the bend.

The aim of this invention, therefore, is to provide improved cooling apparatus for use in the tempering of sheets of curved or bent glass of such construction, arrangement, and operation as to insure an even and uniform treatment of the opposite surfaces of the sheet.

Another object of the invention is to provide cooling apparatus of the above character adjustable for the treatment of glass sheets of varying curvature and embodying means for effecting an even, uniform distribution of the air over the surfaces of the glass.

A further object of the invention is the provision of cooling apparatus of the above character embodying a plurality of stationary blowers at each side of the sheet approximately equidistant therefrom and arranged relative to one another to conform substantially to the curvature of the adjacent surface of the sheet together with movable means associated with said blowers for distributing the air therefrom over the entire surfaces of the sheet.

Other objects and advantages of the invention will become more apparent during the course of the following description when taken in connection with the accompanying drawing.

In the drawing wherein like numerals are employed to designate like parts throughout the same:

Fig. 1 is a horizontal sectional view through improved cooling apparatus constructed in accordance with the invention;

Fig. 2 is a vertical sectional view taken substantially on line 2—2 of Fig. 1; and Fig. 3 is an enlarged detail sectional view of one of the blower units taken substantially on line 3—3 of Fig. 2.

In the embodiment of the invention illustrated in the drawing, the curved or bent sheet of glass 5 to be tempered is shown in position for cooling between the opposed cooling means A and B, said sheet being suspended from a plurality of relatively small hooks or tongs 6 engaging the same near its upper edge. The glass sheet 5 can be brought to a temperature approximating the point of softening of the glass and bent to a predetermined curvature in any desired manner, and after the sheet has been properly heated and bent, it is preferably transferred directly to the cooling apparatus with the least possible loss of heat and exposure to the atmosphere.

The cooling means A and B, at opposite sides of the sheet 5, are of the same construction and operation so that a detailed description of only one need be given. Thus, each cooling means includes a plurality of vertical tubular blowers 7 laterally spaced from one another and suitably closed at their upper and lower ends. The tubular blowers 7 are preferably spaced approximately equi-distant from the glass sheet 5 and are arranged relative to one another in a manner to conform substantially to the curvature of the adjacent surface of the glass sheet. The tubular blowers are also mounted in a fixed position during the cooling operation and may be carried adjacent their upper and lower ends by horizontal rods 8 and 9 slidable through bearings 10 and 11 respectively carried by a horizontal supporting beam 12, said blowers being secured in adjusted position by set screws 13. With this construction, the blowers can be moved toward and away from the glass sheet independently of one another to conform to the curvature of the glass sheet being tempered.

Each blower 7 is provided with an outlet 14 facing in the direction of the glass sheet and this outlet may consist either of a longitudinally extending slot or a plurality of relatively small openings arranged longitudinally of the blower. The blowers at opposite sides of the glass sheet are adapted to be connected by conduits 15 to suitable blowing apparatus (not shown) so that jets or blasts of air will be discharged through the outlets 14 upon opposite surfaces of the said sheet simultaneously.

As pointed out above, the tubular blowers 7 are stationary and in order to effect a uniform distribution of the air issuing from the outlets 14 over the surfaces of the glass sheet 5, there is associated with each blower an air distributing element 16. These air distributing elements consist of bars extending longitudinally of the blowers and substantially V-shaped in cross section. The air distributing elements 16 are mounted for oscillatory movement in front and transversely of the blower outlets 14 and act to distribute the air exhausting through said outlets over the surfaces of the glass in a manner somewhat similar to that obtained by oscillating the blower heads used in tempering flat sheets of glass.

Each air distributing element 16 is carried at its opposite ends by rocker arms 17 and 18 pivotally mounted intermediate their ends upon trunnions 19 and 20 respectively provided at the upper and lower ends by the respective blower 7. Each rocker arm 17 and 18 is provided at its outer free end with an enlarged portion 21 formed with a horizontal slot 22 (Fig. 3), and passing through the slots 22 of all of the rocker arms 17 of the blowers at one side of the sheet is a flexible metal strip 23 while a similar flexible metal strip 24 passes through the slots 22 of all of the rocker arms 18, said strips 23 and 24 being secured to the respective rocker arms 21 and 22 by means of set screws 25.

Each of the metal strips 23 and 24 is pivotally connected at one end, as indicated at 26, to a link 27 which is in turn pivoted as at 28 to a revolving disc 29, the pivot point 28 of link 27 being eccentric with respect to the axis of rotation of the disc 29 so that upon rotation of said disc, the flexible metal strip will be moved back and forth in the direction of its length to effect rocking of the arms 17 and 18 and thereby cause the air distributing elements 16 to oscillate in front of the blower outlets 14. The discs 29 for the strips 23 and 24 may be mounted upon a common shaft 30 and one of said discs may be positively driven from a motor 31, the shaft 32 of which carries a worm 33 meshing with a worm gear 34 carried by the respective disc 29.

The air distributing elements 16 are preferably mounted relatively closely adjacent the outlets 14 in the blowers and the opposite side walls 35 and 36 of each air distributing element diverge away from the blower. Upon oscillation of the air distributing elements, the blasts of jets of air issuing from the blower outlets 14 will be distributed over the surfaces of the glass sheet in a manner to effect an even and uniform cooling of the glass. Thus, when the distributing element is directly in front of the blower outlet, as shown in full lines in Fig. 3, the blasts or jets of air will be substantially evenly divided, with a portion of the air being deflected in one direction by the surface 35 and another portion deflected in the opposite direction by the surface 36. However, when the distributing element is moved in one direction to the position indicated in broken lines a, the blasts or jets of air will be received upon and directed by the surface 35 against the glass sheet, whereas when the said element is moved in the opposite direction to the broken line position b, the air will be deflected and distributed by the surface 36. The continued oscillation of the distributing elements 16 between positions a and b will effect the uniform distribution of the air over the entire surfaces of the glass sheet. Also, by sweeping the air across the sheet surfaces in the manner disclosed, the heat from the sheet can be more effectively and efficiently carried away.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the tempering of glass sheets wherein the sheet is first heated to substantially the softening point of the glass and then suddenly cooled, means for cooling the sheet including a stationary blower arranged at each side thereof and having an outlet facing in the direction of said sheet, and air distributing means mounted for oscillatory movement in front of the blower outlets.

2. In apparatus for use in the tempering of glass sheets wherein the sheet is first heated to substantially the softening point of the glass and then suddenly cooled, means for cooling the sheet including a stationary blower arranged at each side thereof and having an outlet facing in the direction of said sheet, and air distributing means pivotally carried by the blower for oscillatory movement in front of the outlet thereof.

3. In apparatus for use in the tempering of glass sheets wherein the sheet is first heated to substantially the softening point of the glass and then suddenly cooled, means for cooling the sheet including an elongated stationary blower arranged at each side thereof and having an outlet facing in the direction of said sheet, air distributing means associated with each blower comprising a bar extending longitudinally thereof and substantially V-shaped in cross section, and means for mounting said bar for oscillatory movement in front of and transversely of the blower outlet.

4. In apparatus for use in the tempering of glass sheets wherein the sheet is first heated to substantially the softening point of the glass and then suddenly cooled, means for cooling the sheet including a plurality of stationary blowers arranged at opposite sides thereof, the blowers at each side of the sheet being spaced approximately equi-distant therefrom and having outlets facing in the direction of said sheet, and air distributing means mounted for oscillatory movement in front of the blower outlets.

5. In apparatus for use in the tempering of glass sheets wherein the sheet is first heated to substantially the softening point of the glass and then suddenly cooled, means for cooling the sheet including a plurality of stationary blowers arranged at opposite sides thereof, the blowers at each side of the sheet being spaced approximately equi-distant therefrom and having outlets facing in the direction of said sheet, an air distributing element associated with each blower, and means for oscillating said air distributing elements in unison in front of the blower outlets.

6. In apparatus for use in the tempering of glass sheets wherein the sheet is first heated to substantially the softening point of the glass and then suddenly cooled, means for cooling the sheet including a plurality of elongated, stationary blowers arranged at opposite sides thereof, the blowers at each side of the sheet being spaced approximately equi-distant therefrom and having outlets facing in the direction of said sheet, an air distributing element pivotally carried by each blower and extending longitudinally thereof, and means for oscillating said air distributing elements in unison in front of and transversely of the blower outlets.

7. In apparatus for use in the tempering of glass sheets wherein the sheet is first heated to substantially the softening point of the glass and then suddenly cooled, means for cooling the sheet including a plurality of stationary blowers arranged at opposite sides thereof, the blowers at each side of the sheet being spaced approximately equi-distant therefrom and having outlets facing in the direction of said sheet, air distributing means mounted for oscillatory movement in front of the blower outlets, and means for mounting said blowers for adjustment independently of one another toward and away from the said sheet.

8. In apparatus for use in the tempering of glass sheets wherein the sheet is first heated to substantially the softening point of the glass and then suddenly cooled, means for cooling the sheet including a plurality of stationary blowers arranged at opposite sides thereof, the blowers at each side of the sheet being spaced approximately equi-distant therefrom and having outlets facing in the direction of said sheet, an air distributing element associated with each blower, means for oscillating said air distributing elements in unison in front of the blower outlets, and means for mounting said blowers for adjustment independently of one another toward and away from the said sheet.

9. In apparatus for use in the tempering of glass sheets wherein the sheet is first heated to substantially the softening point of the glass and then suddenly cooled, means for cooling the sheet including a plurality of elongated, stationary blowers arranged at opposite sides thereof, the blowers at each side of the sheet being spaced approximately equi-distant therefrom and having outlets facing in the direction of said sheet, an air distributing element pivotally carried by each blower and extending longitudinally thereof, means for oscillating said air distributing elements in unison in front of and transversely of the blower outlets, and means for mounting each blower and air distributing element carried thereby for adjustment toward and away from said sheet as a unit independently of the other blowers and air distributing elements.

ORMOND H. PADDOCK.